United States Patent [19]

Gebelein

[11] Patent Number: 4,881,801

[45] Date of Patent: Nov. 21, 1989

[54] FAST, ABERRATION-FREE FLAT FIELD CATADIOPTRIC TELESCOPE

[76] Inventor: Rolin J. Gebelein, 291 Martin Rd., Santa Cruz, Calif. 95960

[21] Appl. No.: 142,539

[22] Filed: Jan. 11, 1988

Related U.S. Application Data

[60] Continuation-in-part of Ser. No. 782,286, Sep. 30, 1985, Pat. No. 4,718,753, which is a continuation-in-part of Ser. No. 660,916, Oct. 15, 1984, Pat. No. 4,571,036, division of Ser. No. 316,134, Nov. 22, 1981, Pat. No. 4,477,156.

[51] Int. Cl.$^4$ ............................................. G02B 17/08
[52] U.S. Cl. ................................... 350/503; 350/442; 350/481
[58] Field of Search ............... 350/442, 443, 444, 479, 350/480, 481, 503, 504, 505

[56] References Cited

U.S. PATENT DOCUMENTS

| | | | |
|---|---|---|---|
| 2,350,112 | 3/1942 | Houghton . | |
| 2,608,129 | 8/1952 | Taylor | 350/442 |
| 2,685,820 | 8/1954 | Kaprelian | 350/442 |
| 3,022,708 | 2/1962 | Baker | 350/443 |
| 3,110,752 | 11/1963 | Becker | 350/442 |
| 3,180,217 | 4/1965 | Argyle et al. | 350/444 |
| 3,489,487 | 1/1970 | Casas | 350/442 |
| 3,515,461 | 6/1970 | Casas et al. | 350/442 |
| 3,598,468 | 8/1971 | Perry | 350/503 |
| 4,061,420 | 12/1977 | Kaprelian et al. | 350/442 |
| 4,278,330 | 7/1981 | Buchroeder | 350/442 |

OTHER PUBLICATIONS

Willstrop, R. V., "A Simple Coma Corrector for Off—Axis Guiding," Mon. Not. R. Astr. Soc., vol. 191, 1980, pp. 777-783.
Schmidt, "A Rapid Coma-Free Mirror System", Amatuer Telescope Making, pp. 373-375 (1953, 1961).
Maksutov, "New Catadioptric Meniscus Systems", Journal of Optical Society of America, vol. 34, No. 5, 1944 (pp. 270-284).
Jones, "A Wide Field Telescope with Spherical Optics", Sky & Telescope, Sep. 1957, pp. 548-550.
Heumann, "A 10-Inch Spherical Reflector with Negative Correcting Lens", Sky & Telescope, Oct. 1962, pp. 231-235.
Brixner, "Barlow Lens Designs for a Spherical Primary Mirror", Sky & Telescope, Aug. 1966, pp. 103-104.
Field, "Maksutovs with Sub-Aperture Correctors", Sky and Telescope, Aug. 1981, pp. 166-168.
Shafer, "New Designs for Large Telescopes", Optics News, Feb. 1986, pp. 22-23.
Sigler, "All—Spherical Catadioptric Telescope with Small Corrector Lenses", Applied Optics, vol. 21, #15, Aug. 1982, pp. 2804-2808.
Buchroeder, R. A., "A New Catadioptric Telescope Design Suitable for ATM's", Sky & Telescope, Apr. 1968, pp. 249-254.
Dilworth, D. C., "A New Catadioptric Telescope—I", Sky & Telescope, Nov. 1977, pp. 425-432.

*Primary Examiner*—Bruce Y. Arnold
*Assistant Examiner*—Martin Lerner
*Attorney, Agent, or Firm*—Joseph H. Smith

[57] ABSTRACT

This invention relates to Catadioptric Telescopes having concave spherical mirror reflectors as the primary objective and a refractive correction element for reducing the spherical aberration of the primary mirror, and more particularly to a fast, aberration-free flat field telescope employing a spherical primary mirror and unique sub-aperture sized corrector made preferably of one plano-concave lens element and one plano-convex element both of the same kind of glass. This unique corrector also simultaneously corrects aberrations of the primary including its field curvature. The telescope requires no aspherics and is capable of easy adaptation to a Newtonian style configuration.

10 Claims, 5 Drawing Sheets

FIG. 3

| TELESCOPE OF ONE METER FOCAL LENGTH | PETZVAL* CALCULATION DEVIATION FROM PERFECTLY FLAT FIELD (IN INCHES) | | | |
|---|---|---|---|---|
| | FIELD DIAMETER (INCHES) | | | |
| | 0.5 | 1.0 | 2.0 | 3.0 |
| GEBELEIN, DISCLOSURE (DEVIATION IN INCHES) | .0000 | .0002 | .001 | .002 |
| NEWTONIAN, CLASSICAL (DEVIATION IN INCHES) | .0008 | .0031 | .0124 | .0279 |
| SCHMIDT, CLASSICAL (DEVIATION IN INCHES) | .0007 | .0028 | .0112 | .0252 |
| MAKSUTOV, CLASSICAL (DEVIATION IN INCHES) | .0009 | .0034 | .0137 | .0308 |

*FOOT NOTE: IN FIG. 3, VALUES TABULATED ARE THE SAGITTAL DISTANCES BETWEEN A PERFECTLY FLAT FOCAL SURFACE AND THE PETZVAL SURFACE, WHEN THE TWO SURFACES ARE TANGENT AT THE OPTICAL AXIS. THE PETZVAL SURFACE RADIUS IS DERIVED BY THE USE OF THE WELL KNOWN PETZVEL EQUATION FOR FIELD CULVATURE.

$$PTZ_C = 1/\text{PETZVAL RADIUS}$$

= THE ALGEBRAIC SUM OF THE POWER (1/ FOCAL LENGTH) OF EACH ELEMENT DIVIDED BY ITS OPTICAL INDEX i.e.

$$PTZ_C = 1/PTZ_R = \sum \phi/n$$

FIG. 4

| TABLE |||||
|---|---|---|---|---|
| OPTICAL ELEMENT | RADIUS | THICKNESS | SEPARATION | CLEAR APERTURE |
| PRIMARY MIRROR 11 | +96.0 | | 36 nominal | 8.0 |
| SECONDARY MIRROR 12 | ∞ | | 75 nominal | 2.0 nominal |
| LI | R1= -7.0<br>R2= ∞ | d1 = 0.2 | S1=1.5 | 1.75 |
| LII | R3= +5.0<br>R4= ∞ | d2 = 0.3 | S2=3.0 nominal | 1.75 |
| IMAGE 18 | -733.26 | | | |
| ( NOTE: DISTANCE FROM PRIMARY TO IMAGE IS APPROXIMATELY 48.5 INCHES ) |||||

FIG. 5
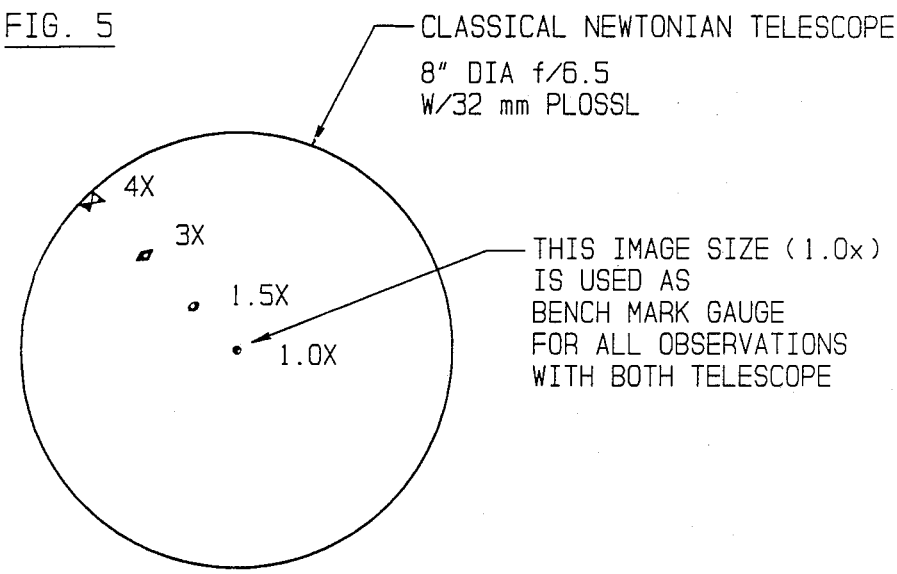
ALL ARE MIDDLE PLEIDES STAR, ALCYONE, 3.0 MAGNITUDE.
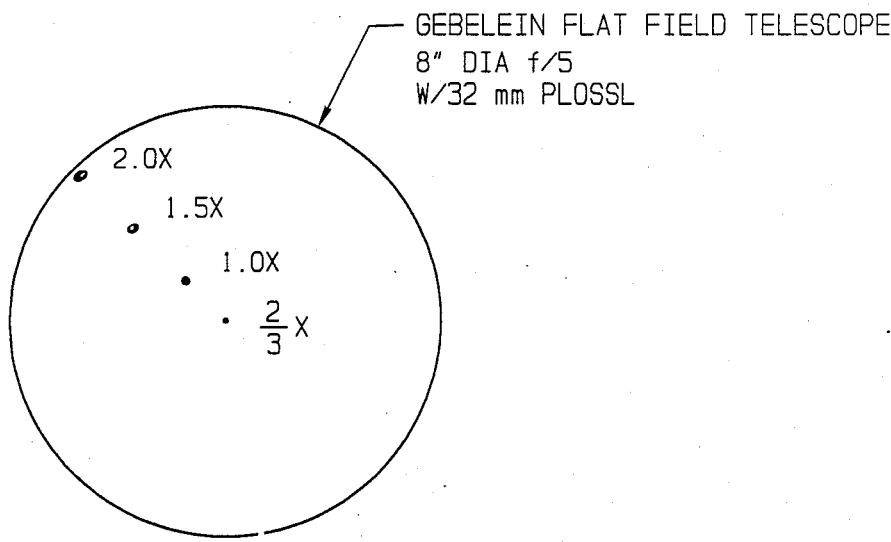
ALL ARE MIDDLE PLEIDES STAR, ALCYONE, 3.0 MAGNITUDE.
(SMALLER, ROUNDER, LESS ABERRATED IN EVERY FIELD POSITION)

FAST, ABERRATION-FREE FLAT FIELD CATADIOPTRIC TELESCOPE

CROSS-REFERENCE TO RELATED APPLICATIONS

This is a continuation-in-part of copending application Ser. No. 782,286, filed Sept. 30, 1985, now issued as U.S. Pat. No. 4,718,753, which is a continuation-in-part of application Ser. No. 660,916, filed Oct. 15, 1984, now issued as U.S. Pat. No. 4,571,036 which is a divisional of application Ser. No. 316,134, filed Nov. 22, 1981, now issued as U.S. Pat. No. 4,477,156.

BACKGROUND OF THE INVENTION

Classical Catadioptric Telescopes employing concave spherical mirror objectives can be fast and aberration free in the visible spectrum, but suffer from field curvature and restrictions due to poor accessibility of their focal surfaces. In addition, correctors for such telescopes are either aspherical (See Schmidt, "A Rapid Coma-free Mirror System", reprinted in *Amateur Telescope Making, Book Three*, pp. 373-375, incorporated herein by reference.), or require tight centering and radius control along with aspherical "retouch" for best performance. (See Maksutov, "New Catadoiptric Meniscus Systems", *Journal of Optical Society of America*, Vol. 34, No. 5. May, 1944, pp. 270-284, incorporated herein by reference).

Spherical concave objective mirrors and spherical corrector lenses are desired for Catadioptric Telescopes because the mirrors can be economically produced in large sizes and spheres are easy to produce in unlimited quantities by well-controlled production processes and are easy to test. Therefore, spherical optics have tremendous advantage over aspheric optics such as parabolic telescope mirrors and aspheric corrector elements which always require scarce skills for their fabrication, and production of aspherics is frequently unpredictable or limited. In addition, except for field curvature, Catadioptric Telescopes employing spherical mirror objectives can be designed to provide larger fields of view than telescopes having aspheric objectives because the spherical surface has no unique optical center, and at the same time still can have good correction of aberrations. Consequently, the image of an object situated off the axis of the telescope and which would be aberrated by an aspheric primary may not be so aberrated by spherical optics.

The main problem of spherical mirrors in Catadioptric Telescopes is (negative) spherical aberration all across the field which must be corrected (nulled). Also the mirror's coma, astigmatism, and negative field curvature should be corrected for wide field use, and the introduction of false color should be avoided.

Obviously, small sub-aperture sized corrector elements, which can be located in the convergent beam should be much easier to produce than those required for telescopes employing a full aperture sized corrector. Most classical Catadioptric Telescopes require full sized corrector elements (located upstream of the objective) and still the field is not flat; because the mirror has a strongly curved (negative) focal surface and the corrector must (in order to yield positive spherical aberration) be either negative or too weak to null this curvature. Another class of Catadioptric Telescopes uses a sub-aperture sized negative achromat made of crown and flint glass or a Barlow lens having positive spherical aberration to correct to negative spherical aberration of spherical primary mirrors. This type of corrector is small and located within the convergent beam, but these telescopes are f/8 or slower and have non-negligible secondary color and tend to have only small useful fields. In addition, the negative optical power of negative achromats obviously can not correct the negative field curvature due to a concave spherical primary mirror objective and always exacerbates it.

Still another class of Catadioptric Telescopes uses a negative power, or weak, one-glass sub-aperture sized corrector and requires more than two corrector elements for best performance, and/or requires (additional) corrective element(s) downstream of an intermediate image, real or virtual, to obtain aberration correction. (See R.D. Sigler, "All-spherical Catadioptric Telescope with Small Corrector Lenses", Applied Optics, Vol. 21, No. 15, 1 Aug. 1982, pp. 2804-2808, incorporated herein by reference.) But again, these correctors all have net negative optical power or are too weak to correct the negative field curvature due to the spherical primary mirror. Also, these designs tend to be slow (i.e. f/7-f/15.7) and to have detrimentally small fields of less than one degree, or one-half degree due particularly to color and astigmatism.

These classes of classical and other Catadioptric Telescopes also require tight centering tolerances for the corrector surfaces and also for the telescope assembly. In addition, due to requirements on spacing between elements of the classes of telescopes that use sub-aperture sized corrector elements, all these have lenses awkwardly positioned along the optical axis as obstructions within the main tube of the telescope. It would be a great convenience, and remove obstructions to the optical path, for these corrector elements to be removed to the side as with a Newtonian style focus; and also sensitivity to positioning and centering errors should be substantially reduced.

Difficulties due to a curved focal surface can be accommodated by using curved photographic plates or curved films to fit the focal surface in the case of photography; or by the use of "field flatteners". Obviously, the use of curved photographic films, plates or curved photosensitive devices (photodetectors) imposes major restrictions in convenience to use and fabrication which are avoided when a lensless standard camera or other device having a flat film plane or plano photographic plates, cut or roll film, flat photodiode array, or other such flat detector can be used directly in conjunction with a flat field telescope.

Field flatteners are extra lenses placed in contact or nearly in contact with the photographic film or surface and thus are a hindrance for visual use, and as they are quite near the image plane, dust and dirt can become quite noticeable. Alternatively, field curvature can be avoided by using a particular Cassegrain configuration in which the radius of curvature of the secondary mirror is chosen to be the same as the radius of the primary and reflects converging light back toward the primary and usually through a hole in it. This choice of equal radii for both mirrors tends to restrict the design; but much worse is the fact that all Cassegrain configurations are extremely sensitive to tilt and decenter of the secondary mirror. Cassegrains are neither simple nor easy to construct because the secondary has power (it is curved in order to extend the focus to provide accessibility to it). The Newtonian style plano secondary mirror is preferred in this regard in that it merely reflects light from the primary toward the side of the instrument for easy accessibility of the focal surface and does not amplify the focal length of the primary mirror and in in principle aberration free. Thus the Newtonian Secondary is relatively tolerant of tilt and decentering errors and also does not increase telescope focal length nor reduce its optical speed.

SUMMARY OF THE INVENTION

This invention relates to Catadioptric Telescopes having concave spherical mirror reflectors as the primary objective and a refractive correction element for reducing the spherical aberration of the primary mirror, and more particularly to a fast, aberration-free flat field telescope employing a spherical primary mirror and unique sub-aperture sized corrector made preferably of one plano-concave lens element and one plano-convex element both of the same kind of glass. This unique corrector also simultaneously corrects aberrations of the primary including its field curvature. The telescope requires no aspherics and is capable of easy adaptation to a Newtonian style configuration.

It is the object of the present invention to provide a fast Catadioptric Telescope which has a flat focal surface approximately 15 times flatter than equivalent Maksutov, Schmidt, or classical Newtonian types of telescopes.

It is still another object of the invention to provide a fast, aberration-free, flat field Catadioptric Telescope which performs better with an f/5 relative aperature than a classical Newtonian reflector telescope having an f/6.5 parabolic primary mirror.

It is yet another object of the invention to provide an all spherical, fast Catadioptric telescope having a useful astronomical field approximating 3.0" inches in linear diameter and 5.0 degrees in angular extent and having an easily accessible flat focal surface in a Newtonian style configuration.

It is yet another object of the invention to provide a unique sub-aperture corrector for spherical mirror telescopes having at once net positive spherical aberration for correcting the negative spherical aberration of a spherical primary mirror and yet also having net positive optical power to simultaneously correct the mirror's negative field curvature; and also having vanishingly small secondary color error, both elements being made of the same type of glass.

It is a further object of the invention to provide an aberration-free Catadioptric Telescope which utilizes a unique sub-aperture corrector having significant positive optical power to increase the optical speed of the telescope.

It is still another object of the invention to provide a corrector for spherical mirrors that is extremely compact and easy to construct having small sized elements and is tolerant of fabrication errors especially centering and radius control in making the glass elements and in assembly.

It is a further object of the invention to provide a fast, aberration-free, flat field Catadioptric telescope assembly which is easy to construct and align said Catadioptric Telescope requiring no aspheres nor tight centering tolerances.

In carrying out the invention, a telescope is provided having a concave spherical primary mirror for the objective and a corrector proximate to the focus of the objective wherein the corrector is comprised of a plano-concave first element with its concavity facing the converging light reflected from the objective/secondary mirror combination, said secondary mirror being a Newtonian style plano diagonal mirror, and said plano-concave first element being of such concavity and being positioned such that the negative spherical aberration of the primary mirror is substantially corrected (nulled), and also simultaneously of such concavity and position that the converging light will be collimated or nearly collimated upon exiting the first element to impinge upon a plano convex second element, which has been reversed from a split meniscus type of configuration as illustrated in FIG. 2, and FIG. 1, so that the (collimated) light first strikes the convex surface of this second element, such reversal resulting in a substantial reduction of the negative spherical aberration due to this second element due to the fact that the impinging light is collimated resulting in a minimum, or near minimum, of negative spherical aberration contribution of the second element of the corrector. However, no reduction occurs in the significant and desirable positive optical power of the second element, the positive optical power being such as to substantially correct (null) the net negative field curvature otherwise resulting from the concave primary mirror and plano concave first element. Thereafter the light exits the plano surface of the second element and is brought to a focus. Both elements of the corrector may preferably be of the same glass type such as Bk-7 glass and achromatism attained.

The following features of the invention are noteworthy. The spacing between the elements of this all-spherical telescope is such that the corrector is conveniently and compactly configured and placed outside of the main tube of the telescope and in a Newtonian focuser so as to avoid difficulties due to obscuration of the primary objective mirror by corrector elements and their mounting spider, and also avoiding duplicity in centering the corrector elements in the beam as the Newtonian focuser itself is already so centered; easy accessibility of the focal plane it being outside of the main tube; sufficient free space is available in which to place a camera downstream of the corrector assembly if desired and yet the corrector does not project into the aperture of the telescope; insensitivity to positional errors in placement of the corrector along the convergent beam in that the corrector is relatively close to focus and involves no aspherics; ease and clarity in visual use in that the field (focal surface) is flat and accessible and is not physically obstructed by a "field flattener" lens and is clear of dirt and dust; freedon from sensitivity to tilt and centering of the secondary mirror as it has no power (is plano).

Other feature of the invention may be acquired from the foregoing and from the following description of a preferred embodiment of the invention.

BRIEF DESCRIPTION OF THE DRAWINGS

FIG. 3 is a table showing the deviation from a perfectly flat field (i.e., showing the distance in inches from the conventionally computed Petzval focal suface to the desired perfectly flat focal surface) of the Gebelein Telescope as disclosed herein; and also showing the deviation from perfect Petzval field flatness of classical Newtonian, Schmidt, and Maksutov telescopes, when all of these telescopes are configured to have a focal length of about one meter (40"). It is seen that the Gebelein Telescope has a Petzval field flatness approximately 15 times flatter.

FIG. 4 is a Table of values for various elements of an exemplary telescope according to the invention.

FIG. 5 is a depiction of actual field observations made with the 8" diameter f/5 Gebelein Telescope disclosed herein compared to side-by side observations done with a perfectly made 8" diameter f/6.5 classical Newtonian Telescope. Both telescopes have their diagonal mirrors mounted directly on plano optical windows to eliminate possible confusing diffraction effects which can occur when spider mounted. Both telescopes have 2.1" diameter central obscuration due to diagonal secondary mirrors and both also have been previously tested in the optical laboratory to confirm freedom from on-axis aberrations by the use of the well-known Ronchi test, and also with other tests. Actual field observational results reported in FIG. 5 show that the Gebelein telescope having a relative aperture of f/5 performs better than the classical Newtonian Telescope having a relative aperature of f/6.5. This is particularly significant because f/6.5 Newtonian Telescopes are widely acknowledged to be excellent performers.

DETAILED DESCRIPTION OF THE PREFERRED EMBODIMENTS

Figure 1:
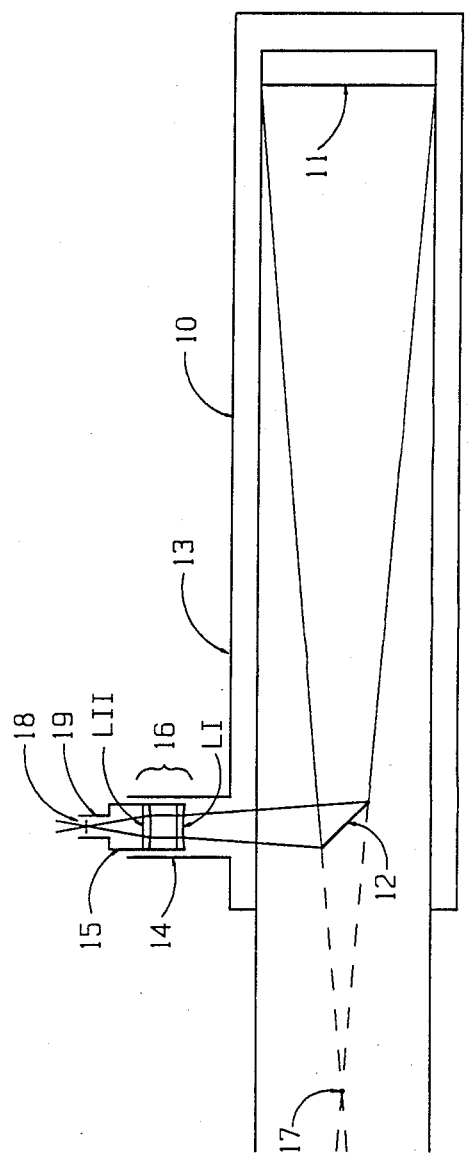
FIG. 1 is a schematic illustration of a Catadioptric Telescope according to the present invention, hereinafter the Gebelein Telescope.

A Catadioptric Telescope 10 constructed according to the present invention is shown schematically in FIG. 1. The spherical primary mirror 11 and Newtonian style plane secondary mirror 12 are mounted in the main telescope tube 13. A Newtonian style focuser 14 is attached to the main telescope tube and its drawtube 15 contains corrector lens assembly 16 elements LI and LII. Parallel light entering the main telescope tube opening (which may be the telescope aperture stop) and striking the spherical primary mirror is reflected and directed toward the (virtual) focus 17 of the primary mirror. However, in order to provide easy access to the image, light converging from the spherical primary mirror is intercepted by the Newtonian style plano secondary mirror and sent through the corrector lens assembly toward the focal surface where the image 18 may be observed with an eyepiece or photographed with a camera. Neither the eyepiece nor the camera specifics form any part of the present invention, hence they are not shown.

Figure 2:
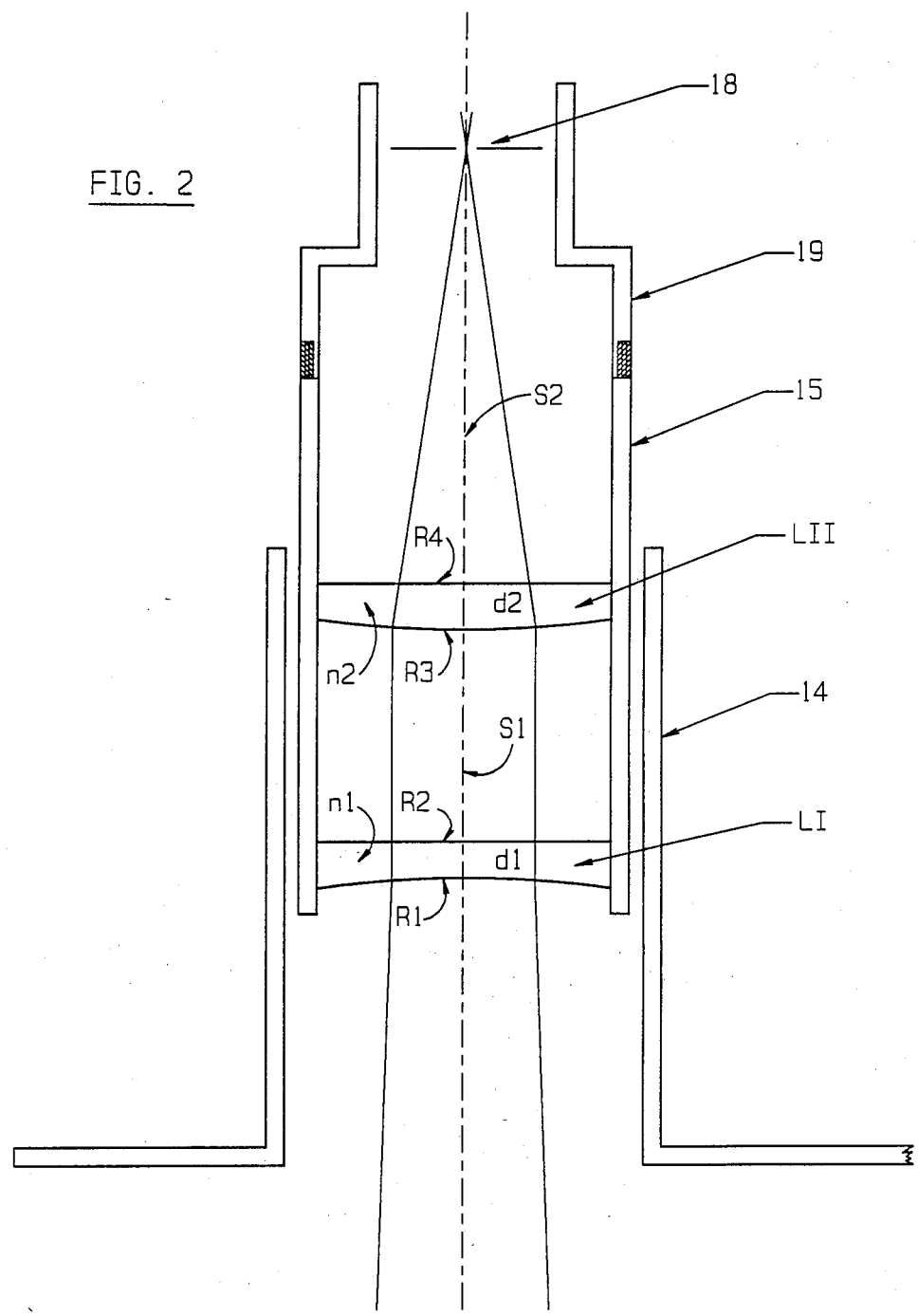
FIG. 2 is a schematic section of the Telescope's unique corrector located within the focuser housing.

The corrector lens assembly, shown in more detail in FIG. 2, is located in the drawtube of the Newtonian style focuser. The corrector lens assembly comprises two simple lens elements LI and LII. Each is made of Bk-7 glass having a refractive index of 1.5168 and an Abbe number of 64.2. Other glasses could be used to extend performance in the ultra violet; and all air-glass surfaces are preferably provided with an anti-reflective coating. The corrector assembly shown has a focal length of (plus) 24.38 inches and hence significant positive power and is positioned with its first radius R1 approximately 43.5 inches downstream of the spherical primary mirror; said spherical primary mirror having a focal length of 48 inches and a clear optical aperture of 8 inches. The combined focal length of this Catadioptric Telescope having the parameters hereinafter set forth is about one meter (actually 40.52 inches) and the relative aperture is thus f/5. Other focal lengths and relative apertures could be used for various purposes, for example a combination yielding a telescope having a focal length of 2.5 meters (100 inches) and a relative aperture of f/6 would provide superior planetary definition. Optically faster combinations and/or shorter focal lengths can also be utilized; to yield, for example, a wider angular field without increasing the linear dimensions of the image format.

In the embodiment of the invention illustrated, the radius of curvature R1 of plano-concave element LI is −7 inches and positioned to collimate or nearly collimate the light between LI and LII and the radius of curvature R3 of plano-convex element LII is 5 inches and LII is positioned reversed from a split menicus configuration, such reversal resulting in substantial reduction of the negative spherical aberration of LII. The thickness of LI and LII is inconsequential as R2 and R4 are plano. Slightly curved radii could also be used for R2 and R4, however, this would substantially reduce the efficacy of the invention and is unnecessary. Likewise, the use of more than two elements is possible wherein similar results may be obtained, but this is also unnecessary.

The conventionally computed Petzval field curvature of the focal surface produced by the Catadioptric telescope having all the parameters set forth above has an absolute value of 0.00136; and the Petzval radius of this field curvature is thus 733.26 inches. It should be noted that the telescope of the present invention has a flat Petzval field curvature more than 18 times flatter than a classical Newtonian telescope employing the usual parabolic primary mirror objective of equivalent 8 inch aperture and 40.52 inch focal length having a conventionally computed Petzval radius absolute value of 40.52". When compared to other classical telescopes of equivalent one meter focal length as shown in FIG. 3, it is seen that the deviation from flatness of field of the present invention compares very favorably with telescopes of classical type. In addition, it should be noted that all the other Catadioptric Telescopes referenced, but not listed in FIG. 3, use negative power correctors, achromatic pairs, or otherwise, and consequently actually do have field curvature much worse than any of the classical telescopes tabulated in FIG. 3 due to the significant negative optical power of all these corrector forms. It is further noted that, by using the technique of the present invention, a perfectly flat Petzval field having zero curvature and infinite radius can be trivially obtained by simply employing a spherical primary mirror of slightly longer focal length (51.362 inches) in combination with the corrector parameters already described (i.e., LI having a radius R1 of −7 inches and LII having a radius R3 of 5 inches, where R2 and R4 are plano and the galss is Bk-7 for both elements); the separations between elements being inconsequential with respect to Petzval field curvature. The telescope relative aperture would then be approximately f/5.4 if an 8 inch aperture primary mirror were used.

Thus, it is seen that the unique corrector form of the present invention has positive optical power; and it also has net positive spherical aberration: this net positive spherical aberration is 36 microradians (angular) in the configuration illustrated and is exactly the correct amount to precisely negate the negative spherical aberration of the spherical aberration of the spherical miror employed. This precise correction is very evident when this telescope is subjected to the well-known Ronchi test, and to star tests: wherein the telescope comprising the present invention is seen to yield perfectly straight Ronchi lines, and it also provides beautiful aberration-free star images.

This unique combination of having significant net positive optical power and simultaneously net positive spherical aberration is not possible to obtain with any of the other known corrector forms, classical or otherwise. This is especially true of all corrector forms employing no aspherics. All other (known) forms constructed of only spherical and piano optics and yielding net positive spherical aberration correction must also have net negative optical power and consequently do detrimentally effect field flatness. In particular, it is noted that the Maksutov Achromatic Meniscus form of corrector must (always) have net negative optical power; both full-sized and sub-aperture sized Maksutov correctors always must have net negative optical power and negative field curvature. Thus, it is seen that the present invention is not merely a new design, but a new form of telescope and corrector.

Furthermore, the telescope of the present invention is quite achromatic and has no secondary spectrum because the corrector is made all of one glass. Axial Achromatism is achieved in the version illustrated due to the fact that the axial ray height striking LI is closely 1.183 times the axial ray height striking LII. The ratio 1.183 is the square root of the absolute value of the inverse ratio of the lens powers ($\sqrt{7/5}$) as is required for axial color correction. This fact is also due to near collimation of axial light within the corrector. Axial color is thus eliminated; and further, lateral color is uniquely trivial due to the fact that, in the present invention, the paraxial chief ray height striking LII uniquely does in fact strike at a height of close enough to 1.4 times the paraxial chief ray height striking LI, as is required to correct for lateral color with the simple one glass lenses having the particular focal lengths illustrated, i.e., 1.4 is the ratio of the absolute value of these focal lengths. These facts of achromatism do yield a telescope which is, as a practical matter (stringently) color free: yet, neither the radii nor the separation of the elements needs to be closely held; and the glass choice is neither restricted nor expensive.

Coma aberration of the spherical mirror alone is of course present in exactly the same amount as it would be with the equivalent parabola, as is astigmatism, but coma is corrected in the telescope illustrated of the present invention due to the fact that the light between LI and LII is collimated or nearly collimated and hence the axial rim ray slope exiting LII is closely 6/5 steeper than the axial rim ray slope entering LI, as is required for coma correction. In addition, due to the fortuitous fact that the primary is spherical, Schmidt's technique of positioning the aperture stop at or near the entrance aperture of the telescope can also be used for the controlling coma and astigmatism or reducing these field aberration in proportion to the stop position.

The optical elements for an 8 inch aperture Catadioptric Telescope of f/5 relative aperture according to the present invention will have the parameters illustrated in the Table of FIG. 4, in which the radii, lens thicknesses, separation, and clear apertures are given in inches.

FIG. 5 shows a comparison of actual field observations made with the Gebelein Telescope disclosed herein and identical observations done simultaneously with a perfectly fabricated classical Newtonian Telescope. Comparisons are shown of the 3rd magnitude star, Alcyone, positioned variously in the field on the night of Dec. 6, 1986, Jupiter is 4.8 AU (astronomical units) distant and it is noted that the separation between two most prominent central bands does appear well resolved in both telescopes, and the distance between these bands being known and taken to be approximately 11,800 miles, their angular separation is thus approximately 5.5 seconds of arc.

A 32 mm focal length Plossl ocular is used for observation made with both telescopes, thus the angular field diameter observed is 1.38 degrees with the 8" aperture f/6.5 Newtonian; but it is 1.8 degrees with the 8" aperture f/5 Gebelein Telescope. Jupiter's Galilean satellites, Europa through Ganymeade, being approximately 2000 miles in diameter through 3500 miles in diameter respectively are unresolved in either telescope at these magnifications; but do appear in both telescopes to be approximately ¼ the size of that represented by the separation distance between Jupiter's two prominent bands. That is, Jupiter's moons appear to be "diffraction limited" in angular size, which computes by the well known equation for the Raleigh diffraction limit ($2.44\lambda/D$) to be 1.375 arc seconds, for mean wavelength, $\lambda$, of 5500 angstroms and telescope aperture, D, of 8 inches diameter. Multiplying the angular separation of the bands which is 5.5 arc seconds, by the observed relative size of the moons which is ¼ $\times$, yields an apparent angular diameter of the moons of 1.375 arc seconds; which checks very closely with the Raleigh diffraction limit. Visual stellar observations made to judge aberrations particularly to gauge the field aberrations, or off-axis quality, of telescopes are conveniently made using relatively bright stars of about magnitude 3.0 as the test object because these are bright enough to have enough power in the aberrated portions of the image so that these aberrated portions will be readily discernible. Due to saturation effects in the eye, bright stars appear larger than dim stars, and in fact, those stars appearing to be only of "diffraction limited" size are much too dim to be useful in gauging aberrations as a practical matter. The same effect of detection non-linearity will be noted with photographic film and other detectors (note that Rayleigh's "diffraction limit" formula actually applies only in the linear region).

Immediately following the observations of Jupiter and her bands and moons, comparison observations were made of the Pleides constellation using the middle star, 3.0 magnitude Alcyone, as the test object (FIG. 5). When placed in the center of the field of the f/6.5 Newtonian Telescope, Alcyone appeared round, and had an apparent diameter just equal in size to the separation distance between Jupiter's two prominent bands, that is to say, Alcyone apparently would have just fit neatly between Jupiter's bands, if this were possible (of course Alcyone was not "resolved", i.e. it did not appear to be a disk, but rather a bright "point"). This observation was then used as a benchmark and all subsequent (off-axis) observations were compared in size relative to this one as a gauge. Some weak nebulosity was apparent around the Pleides, but this was so diffuse so as not to be a factor in these observations. The numbers shown at various field positions represent the relative size of the longest dimension of each star image, and also corresponds roughly to the area of the image. It is noted in FIG. 5 that the Gebelein flat-field f/5 telescope compares very favorably to the classical f/6.5 Newtonian in every field position, including the center. Later on observations were made of the entire Pleides stellar field using the Gebelein Telescope with a 40 mm focal length symmetrical eyepiece and also with a 65 mm focal length eyepiece. No aberrations at all were seen even to the edge of the field in these wide field, lower magnification situations. The field size observed with the 65 mm ocular exceeded 3.6°. Of course, the magnification factor between the telescopes does influence the size of the geometrical aberrations proportionally, but the magnification difference alone accounts for only a portion of the improvement in imagery shown in FIG. 5 of the Gebelein Telescope and this is particularly the case the further from the center of the field one goes; and is also true, remarkably, in the center of the field. Still later, observations were made of the trailing edge of the (Earth's) moon to examine for false color and these images were seen to be exceptionally crisp and substantially color-free at all field positions. The Gebelein Telescope has exceptional aberration-free quality and gives beautiful images.

Thus having described the invention, it is clear that what may appear to be other embodimentss can be provided without departing from the scope and spirit of the invention. Thus, other such Catadioptric telescopes and unique correctors having different parameters can be provided. For example, the corrector lens assembly 16 could be located in a different position, or the Newtonian plano diagonal could be eliminated, or the optical path could be folded in a different way. Furthermore, the application of computer aided design optimization routines surely can benefit the invention; providing alternates and hopefully improvements. Hence, it is intended that the foregoing specification be interpreted as illustrative rather than in a limiting sense.

What is claimed is:

1. A Catadioptric Telescope that is fast and has an aberration free flat field, comprising:
   a spherical primary mirror for an objective; and
   corrector means, proximate to the focus of the objective, wherein the corrector means is comprised of a plano concave first element, or near-plano concave first element, with its concavity facing converging light reflected from the objective and said first element being positioned such that the converging light will be collimated or nearly collimated upon existing the first element to impinge upon a plano convex second element, or near-plano convex second element, which has been reversed from a split meniscus type of configuration so that the collimated light first strikes the convex surface of this second element, such reversal resulting in a substantial reduction of negative spherical aberration due to this second element, but the significant optical power of this second element is not changed, said corrector arranged such that light exits the plano, or near-plano surface of the second element and is directed toward a focus.

2. A Catadioptric Telescope as in claim 1, wherein both elements of the corrector means are made of the same glass type.

3. A Catadioptric Telescope as in claim 2, wherein the glass type is one of either Bk-7, or fused silica.

4. A Catadioptric Telescope as in claim 1, further comprising a secondary mirror located down an optic axis from the objective, for diverting light from the objective to said first corrector element.

5. A Catadioptric Telescope as in claim 4 wherein said secondary mirror comprises a Newtonian style plano diagonal mirror located in an optical path of light reflected from the objective.

6. A Catadioptric Telescope according to claim 5 wherein said spherical primary mirror objective has an 8 inch clear aperature and a focal length of 48 inches corresponding to a radius of +96.0 inches; and wherein the secondary mirror has a nominal separation from the primary mirror of 36 inches and a clear aperture of nominally 2 inches; and wherein the first corrector element is a plano concave element having a radius of −7.0 inches, a thickness of 0.2 inches, a nominal separation of its plano surface from said secondary mirror of 7.5 inches and a clear aperture of 1.75 inches; and wherein said second corrector element is a plano convex element having a radius of +5.0 inches, a thickness of 0.3 inches, with a nominal separation from the plano surface of said first element of 3.0 inches, and a nominal clear aperture of 1.75 inches; said first and second corrector elements being constructed of Bk-7 glass having a refractive index of 1.5168 and an Abbe number of 64.2.

7. A Catadioptric Telescope according to claim 5 further comprising a telescope tube for holding said primary mirror and said secondary mirror, wherein easy access to a focal plane is provided by employing said secondary diagonal mirror such that said corrector means is excluded from the telescope tube, said corrector means being located in the optical path downstream from the secondary Newtonian diagonal mirror.

8. A Catadioptric Telescope according to claim 1 wherein there are no aspheric surfaces in any elements of the telescope.

9. A unique sub aperture corrector comprising:
   a plano-concave, or near plano-concave, first element with its concavity facing converging light reflected from a primary mirror, said plano concave first element being positioned such that the converging light will be collimated, or nearly collimated, upon exiting the first element;
   a plano convex, or near plano-convex, second element located down an optic axis from the first element, which has been reversed from a split meniscus type of configuration so that the collimated, or near collimated light first strikes the convex surface of this second element, such reversal resulting in a substantial reduction of negative spherical aberration due to this second element, but the positive optical power is not changed, so that the light exits the plano surface, or near-plano surface, and is directed toward a focus.

10. A unique, sub-aperture corrector according to claim 9 wherein both said first corrector element and said second corrector element are made of Bk-7 glass having a relative index of 1.5168 and an Abbe number of 64.2, wherein the first corrector element is a plano concave element having a radius of −7.0 inches, a thickness of 0.2 inches, and a clear aperture of 1.75 inches; and wherein said second corrector element is a plano convex element having a radius of +5.0 inches, a thickness of 0.3 inches, with a nominal separation of its plano surface from said first element of 1.5 inches, and a nominal clear aperture of 1.75 inches.

* * * * *